United States Patent
Budhraja et al.

(10) Patent No.: US 6,487,591 B1
(45) Date of Patent: *Nov. 26, 2002

(54) METHOD FOR SWITCHING BETWEEN ACTIVE AND STANDBY UNITS USING IP SWAPPING IN A TELECOMMUNICATION NETWORK

(75) Inventors: Virendra Kumar Budhraja; Richard F. Sustek, both of Petaluma, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,615

(22) Filed: Dec. 8, 1998

(51) Int. Cl.[7] .......................... G06F 15/173; H04L 1/22
(52) U.S. Cl. ............................ 709/223; 370/220; 714/4
(58) Field of Search ................................. 709/220, 221, 709/223, 228, 245; 370/216–220; 714/1–4, 10, 13; 379/9; 713/1, 100; 710/104

(56) References Cited

U.S. PATENT DOCUMENTS

| | | | | |
|---|---|---|---|---|
| 5,289,578 A | * | 2/1994 | Hartheimer et al. | 709/221 |
| 5,522,042 A | * | 5/1996 | Fee et al. | 709/226 |
| 5,787,070 A | * | 7/1998 | Gupta et al. | 370/217 |
| 5,835,696 A | * | 11/1998 | Hess | 714/10 |
| 5,935,209 A | * | 8/1999 | Budhraja et al. | 709/223 |
| 5,974,562 A | * | 10/1999 | Townsend et al. | 714/4 |
| 5,989,060 A | * | 11/1999 | Coile et al. | 439/489 |
| 6,108,300 A | * | 8/2000 | Coile et al. | 370/217 |
| 6,173,312 B1 | * | 1/2001 | Atarashi et al. | 709/206 |
| 6,229,538 B1 | * | 5/2001 | McIntyre et al. | 345/734 |
| 6,308,282 B1 | * | 10/2001 | Huang et al. | 714/4 |
| 6,324,185 B1 | * | 11/2001 | Budhraja | 370/395.1 |

* cited by examiner

Primary Examiner—Zarni Maung
Assistant Examiner—Andrew Caldwell
(74) Attorney, Agent, or Firm—Baker Botts L.L.P.

(57) ABSTRACT

Replacing the functionality of an active digital loop carrier subsystem (DLCSS) or active module with a standby DLCSS or standby module in an IP addressable telecommunication switch is effected by providing only a single externally-known IP address for the module pair and then swapping the IP address of the active module for the IP address of the standby module so that externally-connected devices recognize only the IP address for the module in use. A central network management station in communication with a local nonvolatile memory element controls the IP address swapping.

11 Claims, 2 Drawing Sheets

METHOD FOR SWITCHING BETWEEN ACTIVE AND STANDBY UNITS USING IP SWAPPING IN A TELECOMMUNICATION NETWORK

BACKGROUND OF THE INVENTION

This invention relates to a digital loop carrier (DLC) technology and in particular to techniques for seamless transfer of control between active and standby modules in standard telecommunication transport networks having subscriber terminations and network terminations. More particularly, the invention relates to techniques for configuring primary (main) secondary (protect) Internet Protocol (IP) addressable switching equipment to operate transparently with respect to Internet Protocol (IP)-addressable network devices. A particular class of network devices is contemplated, which employ a multiple-port switching subsystem, such as a B-32 M-14 or a S-10 switch manufactured by Fibex Systems of Petaluma, Calif.

SUMMARY OF THE INVENTION

According to the invention, replacing the functionality of an active digital loop carrier subsystem (DLCSS) or active module with a standby DLCSS or standby module in an IP addressable telecommunication switch is effected by providing only a single externally-known IP address for the module pair and then swapping the IP address of the active module for the IP address of the standby module so that externally-connected devices recognize only the IP address for the module in use.

The invention will be better understood by reference to the following detailed description in connection with the accompanying drawings.

DESCRIPTION OF THE SPECIFIC EMBODIMENTS

Figure 1:
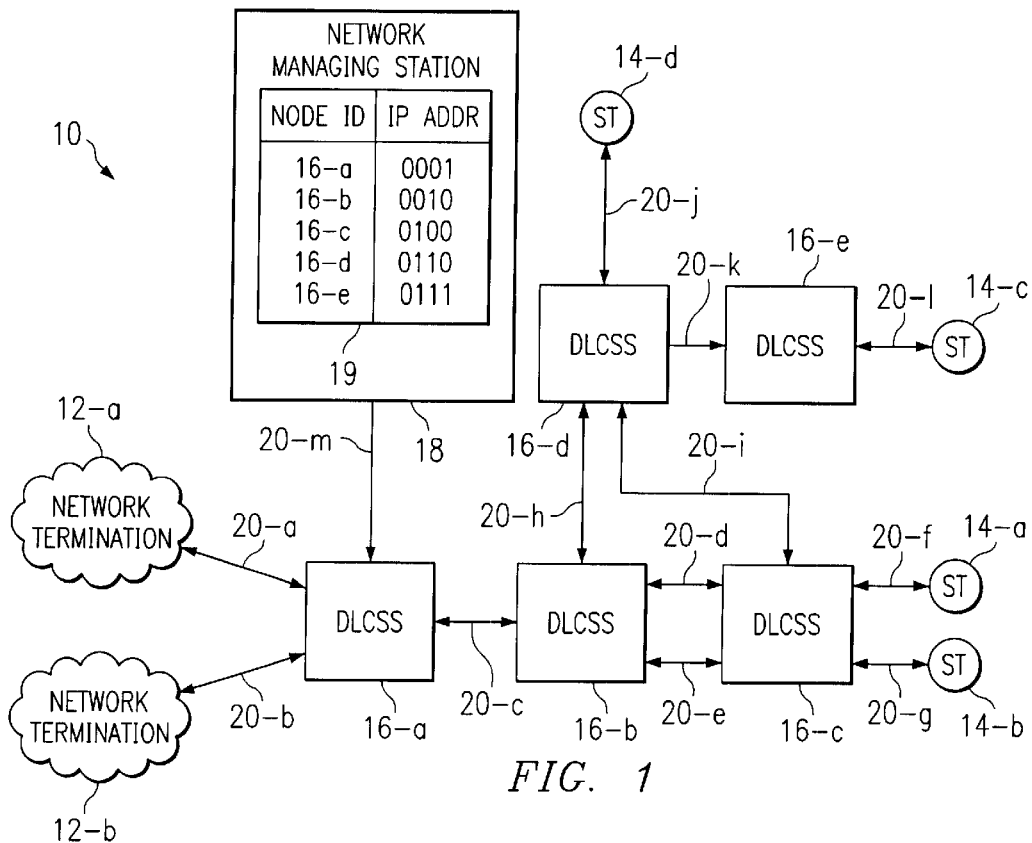
FIG. 1 is a block diagram of a telecommunications network having a network management station and a plurality of DLCSS units according to the invention.

FIG. 1 is a high level block diagram of a DLC network comprising a plurality of multi-service digital local carrier switching systems (DLCSS) 16-*a,* 16-*b,* 16-*c,* 16-*d,* 16-*e,* one or more network terminations 12-*a,* 12-*b* coupled to a DLCSS 16-*a,* one or more subscriber terminations (ST) 14-*a,* 14-*b,* 14-*c,* 14-*d* coupled to one or more DLCSSs 16, and at least one network managing station (NMS) 18 coupled to a DLCSS 16-*a.* The various components are coupled to each other via network links 20-*a* through 20-1. As shown in FIG. 1.

The network shown in FIG. 1 may be any standard transport network such as a Synchronous Optical network (SONET) or an ATM network. Network terminations 12-*a, b* shown in FIG. 1 may include analog line terminations providing analog connection pairs, DS-0 channel terminations providing DS-0 based network connections, DS-1 line terminations providing DS-1 based network connections or the like, any of which may employ the Internet Protocol (IP) addressing scheme. The network connections may themselves be physical interfaces, for example, a DS-1 line interface to a Class-5 switch, or may be part of a bigger network pipe, for example, a DS-0 channel termination which is part of a DS-1 line termination.

Multi-service DLCSSs 16 are primarily responsible for establishing a cross-connection and for providing switching and bandwidth management for the cross-connection. According to the invention each DLCSS 16 is a node which has associated therewith a single IP address by which it is known. The Network Management Station 18 maintains an internal table 19 relating the node identifier with a particular unique IP address. Using this table the NMS 18 can direct commands to individual DLCSS modules causing them to reconfigure. One reconfiguration that may be necessary from time to time is the swapping of a standby subsystem for an active subsystem, as depicted in FIG. 2.

Figure 2:
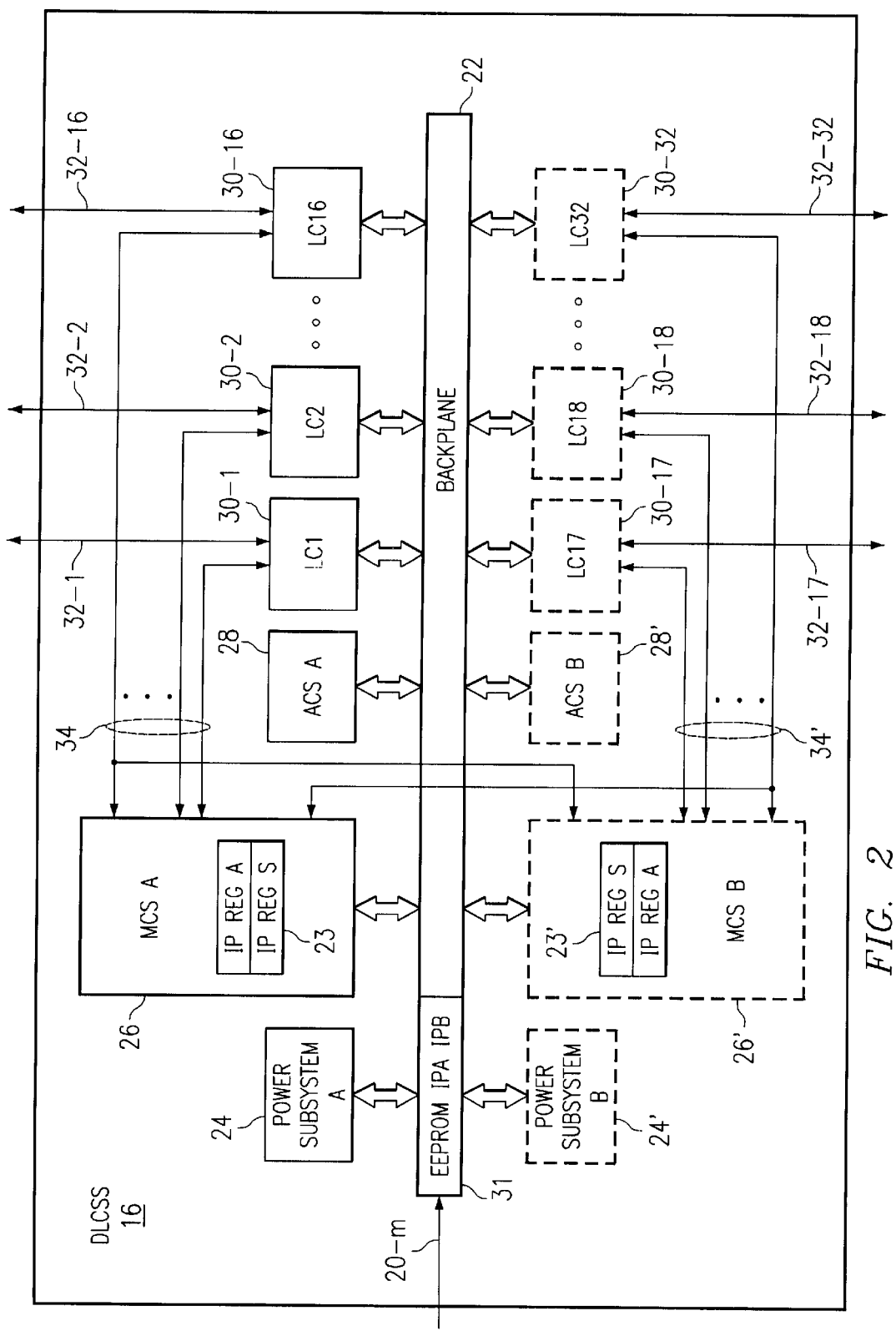
FIG. 2 is a diagram of a multi-service digital loop carrier subsystem (DLCSS) having a normally active MCS module and a normally standby MCS module in a local telecommunications loop according to the invention.

FIG. 2 illustrates a specific embodiment of DLCSS 16. As shown in FIG. 2, DLCSS 16 comprises a plurality of components and subsystems connected to a back plane 22. Back plane 22 provides a mechanism for letting the various components and subsystems of DLCSS 16 communicate with each other as intended. The subsystems include a power subsystem A 24, a main controller subsystem (MCS-A) 26, an advanced controller subsystem (ACS-A) 28, and a plurality of line cards (LCs) 30-1 through 30-32. In addition according to the invention, a redundant set of subsystems, including power subsystem B 24', MCS-B 26, and ACS-B 28' are also provided as standby elements. All are connected to the common back plane, with at least three elements, PS 24, MCS 26 and ACS 28 being mirrored.

In a specific embodiment, each line card 30-1, 30-16 is directly coupled to MCS A 26 and MCS b 26' via connections 34 and 34'. The line card link may either carry traffic to DLCSS 26 or carry network traffic from DLCSS 26. Connections 32-1 through 32-32 respectively facilitate the transfer of incoming network traffic from the line card to the then active MCS 26, and the transfer of outgoing traffic from the then active MCS 26 to the other components of the network after switching and bandwidth management have been performed by the then active MCS 26. When MCS A 26 is active, MCS-B 26' is in standby.

According to the invention, only one MCS is active at any one time in a DLCSS. However, a selected MCS module 26 or 26' is addressable transparently based on a control issued by the NMS 18. A control signal may be communicated via an arbitrary line card 30 or be coupled directly to a special card or other coupling to the back plane 22. In addition, coupling can be made directly to a control interface. In any case the control signal is intercepted by a substantially nonvolatile signal redirection element, such as an EEPROM 31, which may reside on the back plane 22, to interpret the command issued by the NMS 18. The function of the EEPROM 31 is to gate access between the active MCS and the standby MCS.

According to the invention, there are is at least one and preferably two IP addresses associated each MCS of a single DLCSS. The addresses are reassignable. Initially, the first address is designated "IP active" and the second address is designated "IP standby" for the first MCS A 26, whereas simultaneously the first address is designated "IP standby" and the second address is designated IP active for the second MCS B 26'. However, only one IP address is known publicly (i.e., to the network other than the supervisor), and it is used to access the then current MCS module. Both IP addresses may interact with or as pointers and are typically resident in EEPROM 31 on the back plane of the DLCSS 16. Each MCS 26 contains a data structure whereby its IP address is read from the EEPROM 31 so the MCS can be instructed to serve as either the active MCS or the standby MCS. In operation, each MCS loads a local register 23, 23' (which may be part of a RAM) with the EP address or addresses from the EEPROM 31, rendering them respectively active or standby. The EEPROM is thereby used to swap IP addresses between the active and standby MCS modules.

Figure 3:
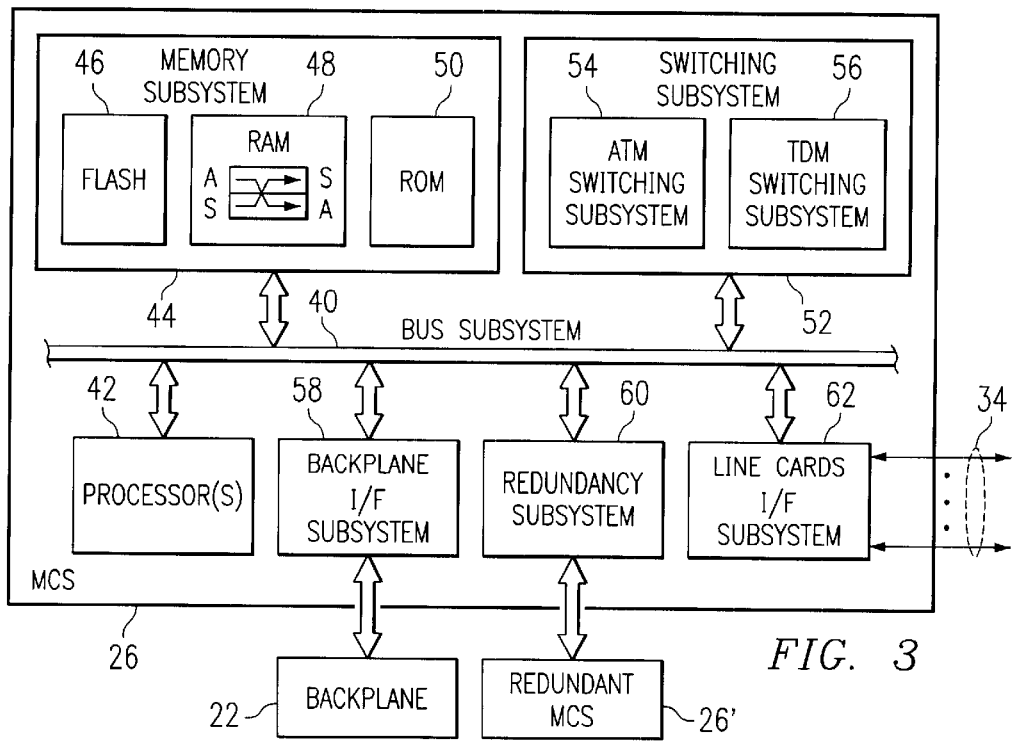
FIG. 3 is a diagram of a multi-switch component subsystem MCS having volatile memory.

FIG. 3 depicts a specific embodiment of MCS 26. As shown in FIG. 3, MCS 26 includes at least one processor 42 which communicates with a number of peripheral subsystems via bus subsystem 40. These peripheral subsystems typically include a memory subsystem 44, a switching subsystem 52, a line cards interface subsystem 62, a back plane interface subsystem 58, and optionally a redundancy subsystem 60 whereby functions can be passed off to the active redundant MCS 26' upon a changeover.

Memory subsystem 44 stores the various data constructs and programming modules that provide the functionality of MCS 26. Memory subsystem 44 typically includes a number of memories including a main random access memory (RAM) 48 for storage of instructions and data during program execution, including the current IP addresses for the active and passive MCSs, a read only memory (ROM) 50 in which fixed instructions are stored, and a FLASH memory 46 in which the various programming module images and databases are stored. FLASH memory 46 mirrors the contents of RAM 48 and thus provides persistent storage of RAM contents in the event that the RAM contents are lost upon loss of power to the RAM. In a specific embodiment, a background process initiated by MCS 26 copies contents from RAM 48 to FLASH memory 46 while a foreground process continues to perform processing based on RAM 48 contents. Memory subsystem 44 may store both static data and dynamic data. Static data is generally data related to the provisioning of the DLCSS 26 by NMS 18 and does not change until the DLCSS 26 is re-provisioned by NMS 18. Dynamic data may change during the operation of the network depending on the status of various hardware and software components within the network system. Swapping of an active DLCSS for a standby DLCSS must often be rapid. The IP address utilization according to the invention facilitates this operation.

It will be noted that the physical configuration is completely symmetric. At startup, therefore, there must be an arbitration between MCS modules to determine which will be active and which will be standby. The arbitration can be biased to select one side over the other.

In operation, a fault in the system triggers a mechanism whereby a switchover is detected. The active MCS 26 then assumes the standby IP address, while the standby MCS 26' assumes the active IP address via the EEPROM 31. The NMS 18 normally has access to only one IP address, namely the active IP address. Any other IP address is not intended to be customer-accessible.

In some circumstances, the IP-address access is needed to the standby MCS, such as when it is important for the NMS 18 to configure the standby MCS to assume a particular configuration, poll alarms, or the like. In such instances, the NMS 18 may address the DLCSS and ask for access to the standby node via a disclosed standby IP address. While the NMS 18 may not know which specific MCS it is accessing, the use of the standby IP address assures access to the then non-active MCS. Similarly, multiple IP addresses could be provided for a group of redundant devices. The controller need only address the designated active IP address, allowing the local modules to select which of its subsystems is assigned the active IP address.

The invention has now been explained with reference to specific embodiments. Other embodiments will be evident to those of ordinary skill in the art upon reference to this description. It is therefore not intended that this invention be limited, except as indicated by the appended claims.

What is claimed is:

1. A communications system comprising:
   a signal redirection element comprising a first memory location and a second memory location;
   a first subsystem comprising a first memory element, the first memory element storing an address stored in the first memory location, the first subsystem operable to receive communications addressed to the address stored in the first memory clement;
   a second subsystem comprising a second memory element, the second memory element storing an address stored in the second memory location, the second subsystem operable to receive communications addressed to the address stored in the second memory element; and
   the signal redirection element operable to store an active subsystem address in the first memory location and to store a standby subsystem address in the second memory location, such that the first subsystem acts in an active status and the second subsystem acts in a standby status, the signal redirection element further operable to sense a prompt to change active status of the first subsystem, and, responsive to sensing the prompt, to store the active subsystem address in the second memory location and to store the standby subsystem address in the first memory location, the change of addresses in the signal redirection element mirrored in the first memory element and the second memory element, thus swapping the active status and the standby status between the first subsystem and the second subsystem and causing the second subsystem to operate in the active status independent of the first subsystem.

2. The system of claim 1, further comprising a central controller coupled to the first subsystem and the second subsystem, the central controller communicating with a selected one of the first subsystem and the second subsystem using the active subsystem address.

3. The system of claim 1, wherein the signal redirection element is an electrically erasable programmable read-only memory (EEPROM).

4. The system of claim 1, wherein the signal redirection element is further operable to sense the prompt during a polling cycle and to store the active subsystem address in the second memory location during the polling cycle.

5. The system of claim 1, wherein:
   the first subsystem comprises a first plurality of line interface cards and a first memory element, the first memory element storing the address stored in the first memory location; and
   the second subsystem comprises a second plurality of line interface cards and a second memory element, the second memory element storing the address stored in the second memory location.

6. The system of claim 1, wherein the prompt is a fault in the first subsystem.

7. A method for providing switchover from an active subsystem to a standby subsystem comprising:

storing an active subsystem address in a first memory location of a signal redirection element;

storing a standby subsystem address in a second memory location of the signal redirection element;

duplicating content of the first memory location in a first memory element of a first subsystem, the first memory element storing an address for communications to the first subsystem;

duplicating content of the second memory location in a second memory element of a second subsystem, the second memory element storing an address for communications to the second subsystem;

sensing a prompt to change active status of the first subsystem; and in response to the prompt:

storing the active subsystem address in the second memory location of the signal redirection element; and storing the standby subsystem address in the first memory location of the signal redirection element, the change of addresses in the signal redirection element mirrored in the first memory element and the second memory element, thus causing the second subsystem to operate in an active status independent of the first subsystem.

8. The method of claim 7, wherein the signal redirection element is an electrically erasable programmable read-only memory (EEPROM) and the first memory element and the second memory element are volatile memory devices.

9. The method of claim 7, wherein the prompt is a fault in the first subsystem.

10. The method of claim 7, further comprising:

sensing the prompt within a polling cycle; and in response to the prompt:

storing the active subsystem address in the second memory location of the signal redirection element during the polling cycle; and storing the standby subsystem address in the first memory location of the signal redirection element during the polling cycle.

11. A communications apparatus comprising:

a back plane comprising a signal redirection element having a first memory location and a second memory location;

a first subsystem comprising a first plurality of line cards coupled to the back plane and a first main controller subsystem (MCS) coupled to the back plane, the first MCS having a first memory element, the first memory element mirroring an address stored in the first memory location;

a second subsystem comprising a second plurality of line cards coupled to the back plane and a second main controller subsystem (MCS) coupled to the back plane, the second MCS having a second memory element, the second memory element mirroring an address stored in the second memory location;

the signal redirection element operable to store an active system address in the first memory location and to store a standby subsystem address in the second memory location, the signal redirection element further operable to sense a prompt to change active status of the first subsystem, and, responsive to sensing the prompt, to store the active system address in the second memory location and the standby subsystem address in the first memory location, the change of addresses in the signal redirection element mirrored in the first memory element and the second memory element thus causing the second subsystem to operate in an active status and the first subsystem to operate in a standby status; and the active subsystem operable to receive network traffic addressed to the active system address using the active line cards, and the active MCS operable to switch the network traffic between the active line cards, such that the apparatus services the network traffic without routing the network traffic through the inactive subsystem.

* * * * *